United States Patent [19]

Schubring

[11] 3,732,566
[45] May 8, 1973

[54] CONTINUOUS WAVE RANGING RADAR

[75] Inventor: Norman W. Schubring, Troy, Mich.

[73] Assignee: General Motors Corporation, Detroit, Mich.

[22] Filed: Oct. 12, 1971

[21] Appl. No.: 188,172

[52] U.S. Cl. ........................... 343/9, 343/8, 343/12 R
[51] Int. Cl. ................................................. G01s 9/50
[58] Field of Search ............................ 343/8, 9, 12 R

[56] References Cited

UNITED STATES PATENTS 3,659,293  4/1972  Gupta.....................................343/8 X

*Primary Examiner*—T. H. Tubbesing
*Attorney*—C. R. Meland et al.

[57] ABSTRACT

A continuous wave ranging radar system in which a transmitted constant amplitude continuous wave is combined with the reflected wave from an object to produce a waveform having a beat frequency equal to the Doppler difference frequency or the relative velocity between the radar system and the object and an amplitude which is an inverse function of the distance therebetween. The relative velocity is obtained from the beat frequency and is divided by the time derivative of the logarithm of the amplitude of the combined wave to obtain the distance between the radar system and the object. The logarithm of the amplitude of the combined wave is also combined with the logarithm of the distance between the radar system and the object to obtain the radar cross-sectional area of the object.

3 Claims, 1 Drawing Figure

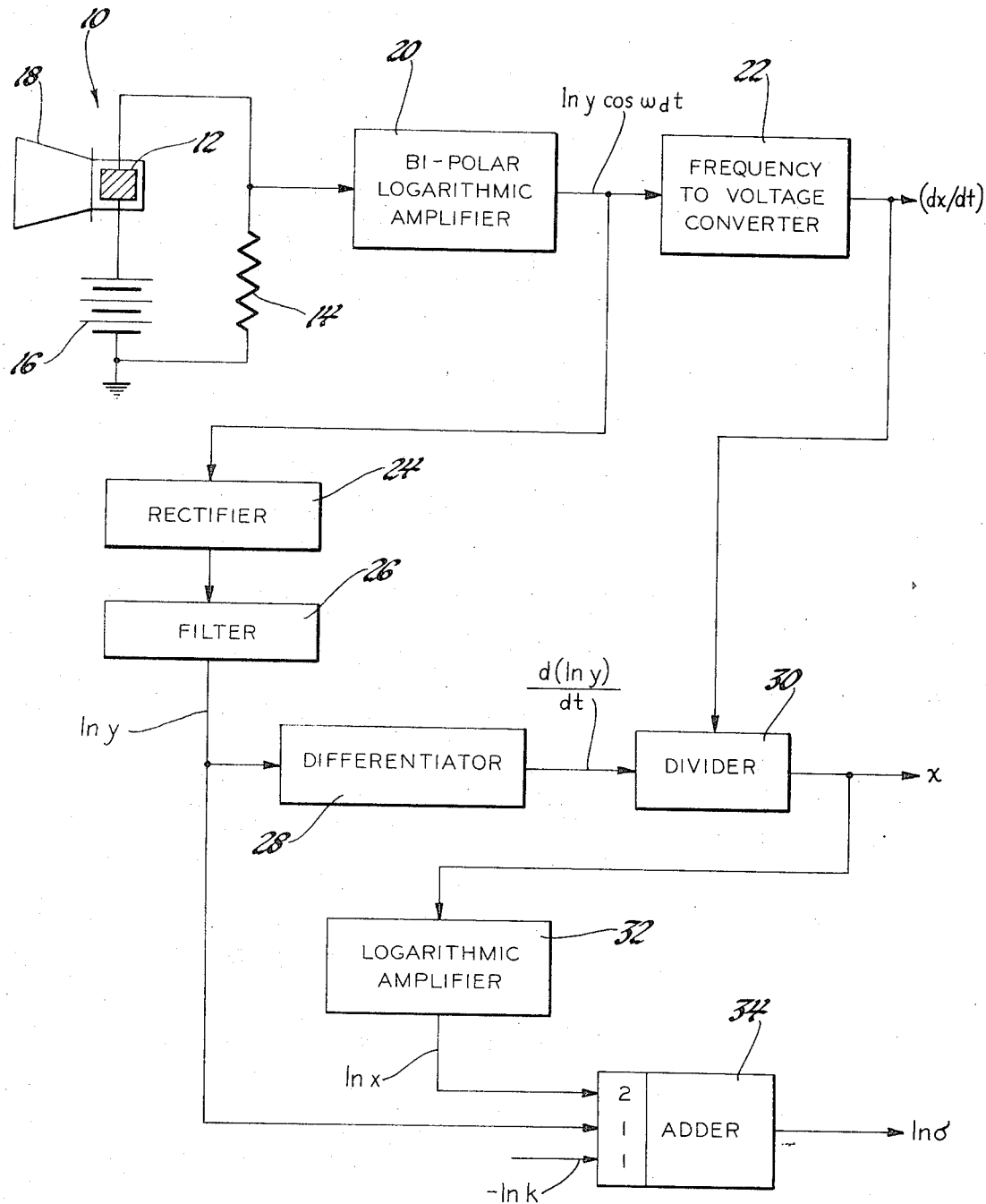

CONTINUOUS WAVE RANGING RADAR

This invention relates to a continuous wave ranging radar system and more specifically, this invention relates to a continuous wave ranging radar system which provides an indication of the range between the radar system and an object over a wide variation in range and which provides an indication of the radar cross-sectional area of the object.

A radar system for determining the range between the radar system and an object in which the radar system transmits a constant amplitude continuous wave signal is known. The equations developed and the apparatus used to mechanize the known system require the linear amplification of the signal representing the Doppler frequency shift. Due to the fact that one decade of distance requires that the input amplifier handle two decades of amplitude, these radar systems are limited in range as a result of the limited range of the linear amplifier. A typical example would be an amplifier having a range of 100 to 1 which corresponds to a distance ranging capability of only 10 to 1. For use in areas such as automotive vehicles this limited range is of insignificant value.

To extend the ranging capabilities of the radar system, I have discovered an equation for the distance between a radar system and an object which permits the use of a logarithmic amplifier at the input of the radar system without any loss of information. Since logarithmic amplifiers have extremely large dynamic ranges, the use thereof at the input of the radar system would greatly extend the ranging capabilities of the radar system.

The amplitude at the receiver, in terms of voltage, of the wave reflected from an object can be expressed by the following equation:

$$Y = k\sigma^{1/2}/x^2 \qquad (1)$$

where $y$ equals the magnitude of the received reflected signal, $k$ equals the radar set constant, $x$ equals the distance between the radar system and the object, and $\sigma$ equals the radar cross-sectional area of the object. For a given object, $\sigma$ is a constant. Therefore, the magnitude of the received reflected signal and the distance between the radar system and the object are the only two variables. From equation (1), the following equation can be developed:

$$dy/dx = -2k\sigma^{1/2} x^{-3} \qquad (2)$$

Since the magnitude of the received reflected signal is a function of the distance between the radar system and the object and if $x$ is a function of time (implying that there is relative velocity between the radar system and the object), the following equations can be developed:

$$dy/dt = d[F(x)]/dx \cdot dx/dt \qquad (3)$$

$$dy/dt = dy/dx \cdot dx/dt \qquad (4)$$

Combining equations (2) and (4), the following equation is obtained:

$$dy/dt = -2k\sigma^{1/2} x^{-3} \cdot dx/dt \qquad (5)$$

By dividing the foregoing equation by equation (1):

$$dy/dt/y = -2dx/dt/x \qquad (6)$$

from which the distance $x$ between the radar system and the object can be solved:

$$(7) \qquad x = -2\frac{y}{dy/dt} \cdot \frac{dx}{dt} = -2\frac{dx/dt}{\dfrac{dy/dt}{y}}$$

From this expression, I have recognized that the term $dy/dt/y$ is equal to $[d(\ln y)]/$. *Substituting the latter expression for the former in equation* (7), the final expression for the magnitude of the distance between the radar system and the object is as follows:

$$x = 2 \, dx/dt / [d(\ln y)/dt] \qquad (8)$$

From this expression, I recognized that the input amplifier of the radar system may be a logarithmic amplifier which facilitates the computation and yet does not lose any of the information. Also, by being able to use a logarithmic amplifier at the input of the radar system, the primary benefit of this invention is obtained. This benefit is the greatly improved ranging capabilities brought about by the extremely large dynamic range of the logarithmic amplifier, which range may be 10 million to one or higher.

I have also recognized from equation (1) that if the magnitude of the reflected signal is determined and the distance between the radar system and the object is determined, the radar cross-sectional area of the object can be calculated. From equation (1) the following equation can be developed:

$$\sigma = x^4 y^2 / k^2 \qquad (9)$$

Since the radar cross-sectional area of the target also may have a very wide dynamic range, the use of a linear amplifier would seriously limit the range of cross-sectional areas that could be determined. To alleviate this problem, the foregoing equation can be developed into the following equation:

$$\ln \sigma = -2 \ln k + 4 \ln x + 2 \ln y \qquad (10)$$

This equation permits the use of a logarithmic amplifier whose output is a function of the radar cross-sectional area of the object. Also, the logarithmic amplifier permits the indication of the radar cross-sectional area of the radar object over a wide range.

It is an object of this invention to provide a continuous wave ranging radar system having increased ranging capabilities.

It is another object of this invention to provide a continuous wave ranging radar system in which the dynamic range of operation is extended by the use of a logarithmic amplifier.

It is another object of this invention to provide a continuous wave radar system which provides an indication of the radar cross-sectional area of the radar object.

The invention may be best understood by reference to the following description of a preferred embodiment and the single figured drawing which is a block diagram of the preferred embodiment of this invention.

Referring to the drawing, there is shown a continuous wave oscillator 10 which is connected in a self-detecting mode. The oscillator includes a Gunn diode 12 connected in series with a resistor 14 across a DC voltage supply 16. The Gunn diode 12 generates a constant amplitude continuous wave signal which is transmitted by a horn 18 toward an object. The reflected signal from the object is received by the horn 18 and is mixed in the Gunn diode 12 with the generated signal to produce across the resistor 14 an alternating signal having a beat frequency equal to the Doppler frequency shift caused by relative motion between the oscillator 10 and the object, and having an amplitude which is an inverse function of the distance between the oscillator 10 and the object. The amplitude of this signal is a direct representation of the magnitude of the received reflected wave. This signal is supplied to a bi-polar logarithmic amplifier 20 which responds to the envelope of the mixed signal and supplies at its output an alternating signal having an amplitude equal to the logarithm of the amplitude of the received reflected signal and having a frequency equal to the Doppler difference frequency previously described. The expression for this signal is:

$$\ln y \cos \omega_d t \qquad (11)$$

where $y$ is the amplitude of the received reflected signal and $\omega^d$ is the Doppler frequency shift.

The bi-polar logarithmic amplifier 20 may take the form of any of the well known logarithmic amplifiers and may be, for example, the bi-polar logarithmic amplifier model 2245C manufactured by Optical Electronics, Inc., P.O. Box 11140, Tucson, Airz. 85706.

The output of the bi-polar logarithmic amplifier is supplied to a frequency-to-voltage converter 22 and to a rectifier 24. The output of the frequency-to-voltage converter 22 is a unidirectional voltage having a magnitude directly proportional to the frequency of its input signal. As this frequency is equal to the Doppler frequency shift, the output of the frequency-to-voltage converter 22 represents the relative velocity ($dx/dt$) between the radar system and the object. The frequency-to-voltage converter 22 may take the form of any of the well known frequency-to-voltage converter and may be, for example, model 3382 manufactured by Optical Electronics, Inc., P.O. Box 11140, Tucson, Ariz. 85706.

The output of the bi-polar logarithmic amplifier 20 is rectified by the receifier 24 which supplies its output to a filter 26. The filter 26 generates and supplies a unidirectional voltage having a magnitude directly proportional to the magnitude of the output signal from the bi-polar logarithmic amplifier 20. Filters of this nature are well known and will not be described in greater detail. The output of the filter can be expressed by the term $\ln y$, where $y$ is the magnitude of the received reflected signal.

The output of the filter 26 is supplied to a differentiator 28 whose output is the time differential of the output of the filter 26 and is described by the expression $d(\ln y)/dt$. This form of differentiator is well known and will not be described in greater detail.

The relative velocity signal ($dx/dt$) at the output of the frequency-to-voltage converter 22 and the output signal $d(\ln y)/dt$ of the differentiator 28 are supplied to a divider 30 which divides the relative velocity by the time derivative of the log of the amplitude of the reflected wave. The quotient of this division satisfies the expression in equation (8) for the distance ($x$) between the radar system and the object. The output of the divider is a unidirectional voltage having a magnitude representing the distance between the radar system and the object. The constant shown in the equation (8) may be provided for in the input or output circuits of either the differentiator or the divider to provide at the output of the divider 30 a voltage having a magnitude which is directly representative of the distance between the radar system and the object. The divider 30 may take the form of any of the well known dividers and may be, for example, the multiplier-divider model 426 connected in the divider configuration manufactured by Analog Devices, Inc., 221 Fifth St., Cambridge, Mass. 02142.

The output of the divider 30 is supplied to an input of a logarithmic amplifier 32 which provides an output satisfying the expression $\ln x$. The logarithmic amplifier 32 may take the form of the bi-polar logarithmic amplifier 20. The output of the logarithmic amplifier 32 is supplied to an input of an adder 34 which also receives an input from the output of the filter 26. The adder has a third input which is a constant representing $-\ln k$ in the equation (10) which can be generated in any well known manner. By the use of scaling resistors in the adder 34 having the ratios shown, an output signal is generated which satisfies the equation (10) for the logarithm of the radar cross-sectional area of the object. Consequently, the output of the adder 34 is a unidirectional voltage having a magnitude directly proportional to the logarithm of the cross-sectional area of the object. The adder 34 can take the form of any of the well known adders.

The input and output circuits which may be required by the individual elements shown in the figure for signal conditioning or scaling have not been shown as their designs are accomplished by standard engineering techniques and are determined by the specific circuits chosen for accomplishing the foregoing functions.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. A radar system for determining the distance over a wide range between the system and the object, the system and the object having a relative velocity, comprising means for radiating a constant amplitude continuous wave toward an object, detecting the wave reflected from the object and combining the radiated wave and the detected wave, the combined wave having a beat frequency equal to the Doppler frequency shift and having an amplitude which is an inverse function of the distance between the system and the object and a direct function of the magnitude of the sensed reflected wave; and circuit means connected to the last-mentioned means and responsive to the combined wave for generating a signal representing the ratio between the magnitude of the Doppler frequency shift and the time derivative of the logarithm of the magnitude of the sensed reflected wave, the magnitude of said signal being directly related to the distance between the radar system and the object.

2. A radar system for determining the distance over a wide range between the system and an object, the system and the object having a relative velocity, comprising means for radiating a constant amplitude continuous wave toward an object, detecting the wave reflected from the object and combining the radiated wave and the detected wave, the combined wave having a beat frequency equal to the Doppler frequency shift and having an amplitude which is an inverse function of the distance between the system and the object and a direct function of the magnitude of the sensed reflected wave; logarithmic amplifying means coupled to the last-mentioned means and responsive to the combined wave for supplying a signal having a frequency equal to the Doppler frequency shift and having an amplitude which is a logarithmic function of the amplitude of the sensed reflected wave; converter means coupled to the logarithmic amplifying means and responsive to the signal supplied thereby for supplying a unidirectional voltage having a magnitude directly proportional to the Doppler frequency shift; circuit means coupled to the logarithmic amplifying means and responsive to the output signal supplied thereby for supplying a unidirectional voltage directly proportional to the logarithm of the amplitude of the sensed reflected wave; differentiating means coupled to the circuit means and responsive to the unidirectional voltage output thereof for supplying a signal which is the time derivative of said unidirectional voltage output; and divider means coupled to the converter means and the differentiating means and responsive to the signals supplied thereby for dividing the unidirectional voltage supplied by the converter means by the signal supplied by the differentiating means and supplying a signal directly proportional to the quotient, said signal being a representation of the distance between the system and the object.

3. A radar system for determining the distance between the system and an object, the relative velocity between the system and the object and the radar cross-sectional area of the object, the system and the object having a relative velocity and the radar system having a radar constant $k$, comprising means for radiating a constant amplitude continuous wave toward an object, detecting the wave reflected from the object and combining the radiated wave and the detected wave, the combined wave having a beat frequency equal to the Doppler frequency shift and having an amplitude which is an inverse function of the distance between the system and the object and a direct function of the magnitude of the sensed reflected wave; first logarithmic amplifying means coupled to the last-mentioned means and responsive to the combined wave for supplying a signal having a frequency equal to the Doppler frequency shift and having an amplitude which is a logarithmic function of the amplitude of the sensed reflected wave; converter means coupled to the first logarithmic amplifying means and responsive to the signal supplied thereby for supplying a unidirectional voltage having a magnitude directly proportional to the Doppler frequency shift, said unidirectional voltage being a direct representation of the relative velocity between the system and the object; first circuit means coupled to the first logarithmic amplifying means and responsive to the output signal supplied thereby for supplying a unidirectional voltage directly proportional to the logarithm of the amplitude of the sensed reflected wave; differentiating means coupled to the first circuit means and responsive to the unidirectional voltage output thereof for supplying a signal which is the time derivative of said unidirectional voltage output; divider means coupled to the converter means and the differentiating means and responsive to the signals supplied thereby for dividing the unidirectional voltage supplied by the converter means by the signal supplied by the differentiating means and supplying a signal directly proportional to the quotient, said signal being a representation of the distance between the system and the object; second logarithmic amplifying means coupled to the divider means and responsive to the output thereof for generating a signal which is the logarithm of the distance between the system and the object; and second circuit means connected to the second logarithmic amplifier and the first circuit means and responsive to the outputs thereof for supplying a signal representing the sum of said outputs and the negative logarithm of the radar constant $k$, the signal being a direct representation of the logarithm of the radar cross-sectional area.

* * * * *